Patented Sept. 20, 1949

2,482,169

UNITED STATES PATENT OFFICE 2,482,169

ACYL DERIVATIVES OF DIAMINODIPHENYL-SULFONE AND PREPARATION THEREOF

Richard S. Gubner, Brooklyn, N. Y., assignor to The Equitable Life Assurance Society of the United States, New York, N. Y., a corporation of New York No Drawing. Application September 13, 1946, Serial No. 696,942

7 Claims. (Cl. 260—397.6)

1

This invention relates to novel derivatives of 4,4'-diaminodiphenylsulfone and to the use thereof in chemotherapy. Certain features of this invention also relate to the synthesis and purification of such compounds.

The purpose of this invention is to provide new compounds which possess high therapeutic activity, specifically in combating infection due to the tubercle bacillus, and which are low in toxicity, possess substantial water-solubility for administration in therapeutically effective amounts when dissolved in an aqueous medium and possess the stability required for a chemotherapeutic agent of the type in question.

The new compounds of my invention which possess the combined properties above mentioned are defined by the term sodium formaldehyde bisulfite derivative of 4-acylamino 4'-aminodiphenylsulfone, the acyl radical being selected from the group consisting of capronyl (also called hexanoyl and derived from caproic acid), heptoyl, octanoyl, pelargonyl, and decanoyl. By alternative nomenclature, these compounds also are herein designated as sodium salt of 4-acylamino-diphenylsulfone 4'-aminomethylsulfonic acid and have the generic formula

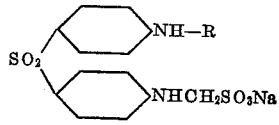

wherein R is the acyl radical, the acyl radical being specifically limited to those hereinabove specified.

4,4'-diaminodiphenylsulfone has been shown to exert a favorable effect in experimental tuberculosis infection (Rist, Bloch and Hamon; Ann. Inst. Pasteur 64:203, 1940 Smith, Emmart and Westfall; J. Pharm. and Exp. Ther. 74:163, 1942 Feldman, Hinshaw and Moses; Am. J. Med. Sci. 207:290, 1944). However, the high toxicity of this compound has precluded clinical application. Prior proposals for the modification of 4,4'-diaminodiphenylsulfone by production of derivatives so as to attempt to minimize toxicity have resulted in greatly decreased activity against the tubercle bacillus when effective reduction in toxicity has been afforded. Thus, because of the problem of toxicity, introduction of such derivatives in clinical medicine has previously been limited to the di-glucose sulfonate derivative and the di-sodium formaldehyde sulfoxylate derivative, but these compounds are of greatly reduced activity against the tubercle bacillus, and the former, for example, is effective in vitro against the tubercle bacillus only in concentrations above 60 milligrams per 100 c. c. Even then effectiveness is believed to be due to decomposition of the di-glucose sulfonate derivative and release of 4,4'-diaminodiphenylsulfone rather than to any specific activity of the compound itself. Moreover, while the di-glucose sulfonate derivative and the di-sodium formaldehyde sulfoxylate derivative are sufficiently low in toxicity to permit of introduction into clinical medicine, they nevertheless possess a degree of toxicity which precludes wide use, and they cannot be administered orally because of decomposition and increased toxicity.

Mono-acyl derivatives of 4,4'-diaminodiphenylsulfone, wherein the acyl radical contains less than 6 carbon atoms, e. g., 4-valeroylamino 4'-aminodiphenylsulfone, have been found to possess good activity against streptococci infection, but I have found that such derivatives are without effect against the tubercle bacillus.

As aforesaid, the acyl radical which is contained in the new compounds of my invention contains from 6 to 10 carbon atoms. However, in the case of di-acyl derivatives containing any such acyl group and in the case of mono-acyl derivatives containing any such acyl group with the other amino group of the original 4,4'-diaminodiphenylsulfone unchanged, I have found that the virtually complete water insolubility of the compounds precludes their successful use in chemotherapy. Moreover, I have found that the sodium formaldehyde sulfoxylate and phosphoryl modifications of such compounds possess such excessive instability as to preclude their availability for chemotherapeutic use.

The new compounds of my invention I have discovered to be of great activity against the tubercle bacillus, being comparable to 4,4'-diaminophenylsulfone in this regard while at the same time being remarkably free of toxicity. Thus, complete inhibition of the tubercle bacillus in vitro has been shown at concentrations of 2 milligrams per 100 c. c. and marked inhibition has been shown at concentrations as low as 1 milligram per 100 c. c. Moreover, the inhibiting action results from the new compounds as such rather than possible decomposition products. With regard to toxicity, 4,4'-diaminodiphenylsulfone has been found to be excessively toxic when orally administered in a single dosage of 0.25 gram per kilogram of body weight of animal tested. By contrast, in the case of the new compounds of my invention no toxic effect whatever was apparent in the case of mice receiving orally a dosage of 0.25 gram per kilogram of body weight each day for a period of 38 days. Moreover, no toxic effect was apparent upon oral administration to mice of the new compounds of my invention in a single dosage of 4.0 grams per kilogram of body weight of animal tested. In other words, the new compounds of my invention have been found by me as the result of extensive toxicity studies to possess remarkable freedom from toxicity.

The new compounds of my invention have been found by me to be highly specific, for these compounds while highly active against the tubercle bacillus do not possess bacteriostatic effect against such organisms as hemolytic streptococcus, type 2 pneumococcus, staphylococcus and the diphtheria bacillus, even in concentrations up to 100 milligrams per 100 c. c., i. e., approximately ten times the level maintained in the body fluids. It has previously been mentioned that the mono-acyl derivatives of 4,4'-diaminodiphenylsulfone wherein the acyl radical contains less than 6 carbon atoms behave oppositely, namely, are without effect against the tubercle bacillus but possess activity against streptococci infections.

The new compounds of my invention possess solubility in water that is more than ample for therapeutic administration in aqueous media, namely, the water solubility is of the order of 1% at 0° C., 5% at 20° C. and 10% at 35° C., as compared with less than 0.0025% at 37° C. in the case of the corresponding mono-acyl compounds that have not been converted to the formaldehyde bisulfite derivative. The new compounds are perfectly stable in solid form and are highly resistant to decomposition in water solution. Thus, in a 0.1% water solution at a pH of 7 and at 37° C. no trace of decomposition, as evidenced by appearance of traces of turbidity, was observable upon standing for a period up to seven days.

For purposes of illustration, the synthesis of sodium salt of 4-capronyldiphenylsulfone 4'-aminomethylsulfonic acid will be described starting with 4,4'-diaminodiphenylsulfone, certain steps of the synthesis constituting features of my invention which are referred to more in detail hereinbelow.

The first step in the synthesis consists in the preparation of 4-capronylamino 4'-aminodiphenylsulfone. 300 grams of 4,4'-diaminodiphenylsulfone are mixed with an excess of caproic acid (200 to 300 c. c.) and the mixture is distilled slowly forward at atmospheric pressure for 60 to 90 minutes. The temperature of the reaction mixture is maintained at 180° C. to 190° C. during the reaction period. The water that is formed during the reaction distills out, together with some of the caproic acid. Excess caproic acid is then removed, for example, by vacuum distillation or by extraction with dilute alkali.

The foregoing operation converts about one-third of the 4,4'-diaminodiphenylsulfone to the monocapronyl derivative; and the next step consists in separation of this monocapronyl derivative from the unreacted 4,4'-diaminodiphenylsulfone. The crude reaction product produced as above described is dissolved in methanol (about 400 c. c.). To the methanol solution concentrated hydrochloric acid (about 400 c. c.) is added with cooling and stirring, followed by 500 c. c. of water. Precipitation takes place during the addition of the water and is completed by cooling the mixture to 15° C. The precipitate which is the crude hydrochloride of 4-capronylamino 4'-aminodiphenylsulfone is filtered off and washed with dilute hydrochloric acid, thereby separating it from the unreacted 4,4'-diaminodiphenylsulfone which remains dissolved in the dilute acid solution.

The crude hydrochloride above mentioned is dissolved in methanol (about 1000 c. c.) with the aid of heat; activated carbon (about 10 grams) is added and the solution is filtered. To the solution 500 c. c. of water are added and the mixture is cooled slowly to 5° C. This treatment dissociates the hydrochloride, and free 4-capronylamino 4'-aminodiphenylsulfone precipitates out. The mixture is preferably held at 5° C. for 48 hours to ensure complete precipitation. The precipitate, which may be partly amorphous, is filtered off and recrystallized from methanol and water in the same way. This time the precipitate is entirely crystalline. Further purification may be effected by recrystallization from anhydrous methanol. The purified product melts at 180-181° C.

In the process for the production of the 4-capronylamino 4'-aminodiphenylsulfone that has been described above, the use of the acid as the acylating agent and heating in the absence of solvent has the advantage of producing the mono-acyl derivative substantially free of the di-acyl derivative. If an acyl chloride or an acid anhydride were employed in the presence of a solvent, as is in line with prior conventional procedure for acylation, a greater proportion of the di-acyl derivative is obtained, which is objectionable because of the difficulty encountered in separating the di-acyl derivative from the mono-acyl derivative. Moreover, use of a solvent is eliminated. According to the procedure above outlined, the mono-acyl derivative is produced in such pure form that any traces of the di-acyl derivative do not interfere in any way with the subsequent synthesis or the utility of the completely synthesized product for the purposes herein described. If desired, any traces of the di-acyl derivative can be removed by fractional precipitation of the hydrochloride from the hydrochloric acid solution as above described by adding the acid and water in successive portions instead of all at once so as to obtain only partial precipitation at each stage, the solution being cooled and filtered after each addition. The first fraction precipitated contains the largest proportion of any di-acyl derivative that is present and subsequent fractions afford the mono-acyl derivative in increasingly pure form.

Another feature of the foregoing process is the separation of the mono-acyl derivative from unreacted 4,4'-diaminodiphenylsulfone utilizing the observed differential solubility of these substances in dilute hydrochloric acid to effect precipitation of the hydrochloride of the mono-acyl derivative while the 4,4'-diaminodiphenylsulfone remains in solution. Another unusual property observed is that the hydrochloride of the mono-acyl derivative dissociates in water whereby the 4-acylamino 4'-aminodiphenylsulfone is recovered for subsequent use in the synthesis.

The synthesis of the sodium salt of 4-capronyl-aminodiphenylsulfone 4'-aminomethylsulfonic acid will now be described. Nine grams of sodium formaldehyde bisulfite, 20 grams of 4-capronyl-amino 4'-aminodiphenylsulfone, and 20 c. c. of ethylene glycol are heated with stirring to 130° C. and held at that temperature for 10 minutes. The solution is poured into 500 c. c. of dioxan and the mixture is cooled to 10° C. The amorphous precipitate is filtered off, washed with dioxan, and air dried. Further purification may be effected by dissolving the precipitate above obtained in water (6 c. c. of water per gram of precipitate) at 45° C. and cooling the solution to 0° C. The product crystallizes out and is filtered off and air dried.

While the specific description of the synthesis has been concerned with the monocapronyl derivative starting with caproic acid, one can produce the sodium salt of 4-heptoylaminodiphenylsulfone 4'-aminomethylsulfonic acid, the sodium salt of 4-octanoylaminodiphenylsulfone 4'-aminomethylsulfonic acid, the sodium salt of 4-pelargonylaminodiphenylsulfone 4'-aminomethylsulfonic acid, and the sodium salt of 4-decanoylaminodiphenylsulfone 4'-aminomethylsulfonic acid, similarly except that instead of employing caproic acid for acylation one employs respectively heptoic acid, octylic acid, pelargonic acid or decanoylic acid. While the employment of the acids for acylation is regarded as preferable for the reasons above stated, the anhydrides of the foregoing acids may also be employed. Of the foregoing compounds of my invention, the sodium salt of 4-capronylaminodiphenylsulfone 4'-aminomethylsulfonic acid is preferred as possessing the most desirable combination of the properties aforesaid for chemotherapeutic application against the tubercle bacillus.

In the foregoing synthesis, it is apparent that the specific description is presented for illustrative purposes and not by way of limitation and that variations therein may be made. Thus, instead of methanol, other usual solvents may be used in lieu thereof.

In the new compounds of my invention, the methyl sulfonic acid sodium salt radical ($CH_2SO_3Na$) affords the substantial water solubility of the compound and provides the compound in stable form. The activity of the compound against the tubercle bacillus is due to the balance of the compound, but such activity is otherwise unavailable for such purpose in the absence of the water solubility.

I claim:

1. The substantially water-soluble acyl derivatives of 4,4'-diamonodiphenylsulfone prepared for anti-tuberculosis administration which are of the formula

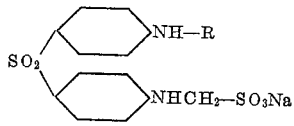

wherein R represents an acyl radical which is a member of the group consisting of capronyl, heptoyl, octanoyl, pelargonyl and decanoyl.

2. A medicinal remedy for anti-tuberculosis administration comprising essentially the sodium salt of 4-capronylaminodiphenylsulfone 4'-aminomethylsulfonic acid.

3. In the synthesis in pure form for anti-tuberculosis administration of sodium salt of 4-acylaminodiphenylsulfone 4'-aminomethylsulfonic acid, wherein the acyl radical is an acyl radical which is a member of the group consisting of capronyl, heptoyl, octanoyl, pelargonyl and decanoyl, the steps comprising monoacylation of 4,4'-diaminodiphenylsulfone by distillation of a mixture of 4,4'-diaminodiphenylsulfone with the acid corresponding to an acyl radical which is a member of the aforesaid group in the absence of a solvent to form the mono-acyl derivative of 4,4'-diaminodiphenylsulfone in the presence of unreacted 4,4'-diaminodiphenylsulfone, dissolving said mono-acyl derivative of 4,4'-diaminodiphenylsulfone and said unreacted 4,4'-diaminodiphenylsulfone in a solvent, adding concentrated hydrochloric acid to form the hydrochloride of said monoacyl derivatve, precipitating said mono-acyl derivative in the form of the hydrochloride by diluting hydrochloric acid contained in said solution with water, separating said hydrochloride precipitate from the mother liquor, dissolving the recovered hydrochloride in a solvent, adding water to the resulting solution to form 4-acylamino 4'-aminodiphenylsulfone and recovering said 4-acylamino 4'-aminodiphenylsulfone by crystallization and separation from the mother liquor, and reacting the so recovered 4-acylamino 4'-aminodiphenylsulfone with sodium formaldehyde bisulfite and ethylene glycol by heating the mixture.

4. In a process for the production in pure form for anti-tuberculosis administration of 4-acylamino 4'-aminodiphenylsulfone wherein the acyl radical is an acyl radical which is a member of the group consisting of capronyl, heptoyl, octanoyl, pelargonyl and decanoyl, the steps comprising mono-acylation of 4,4'-diamonodiphenylsulfone by distillation of a mixture of 4,4'-diaminodiphenylsulfone with the acid corresponding to an acyl radical which is a member of the aforesaid group in the absence of a solvent to form the mono-acyl derivative of 4,4-diaminodiphenylsulfone in the presence of unreacted 4,4'-diaminodiphenylsulfone, dissolving, said mono-acyl derivative of 4,4'-diaminodiphenylsulfone and said unreacted 4,4'-diaminodiphenylsulfone in a solvent, adding concentrated hydrochloric acid to form the hydrochloride of said mono-acyl derivative, precipitating said monoacyl derivative in the form of the hydrochloride by diluting hydrochloric acid contained in said solution with water, separating said hydrochloride precipitate from the mother liquor, dissolving the recovered hydrochloride in a solvent, adding water to the resulting solution to form 4-acylamino 4'-aminodiphenylsulfone and recovering said 4-acylamino 4'-aminodiphenylsulfone by crystallization and separation from the mother liquor.

5. The acylation of 4,4'-diaminodiphenylsulfone by direct reaction in the absence of a solvent with an acid which is a member of the group consisting of caproic, heptoic, octanoic, pelargonic and decanoic under the influence of heat to produce 4-acylamino 4'-aminodiphenylsulfone, water formed as a result of the reaction being distilled off as formed during the progress of this reaction.

6. In the separation of 4-acylamino 4'-aminodiphenylsulfone wherein the acyl radical is an acyl radical which is a member of the group consisting of capronyl, heptoyl, octanoyl, pelargonyl and decanoyl from a mixture thereof with 4,4'-diaminodiphenylsulfone, the steps comprising dissolving the mixture in a solvent, incorporating concentrated hydrochloric acid and diluting the resulting solution with water to precipitate the hydrochloride of 4-acylamino 4'-aminodiphenylsulfone.

7. In the purification of 4-acylamino 4'-aminodiphenylsulfone wherein the acyl radical is an acyl radical which is a member of the group consisting of capronyl, heptoyl, octanoyl, pelargonyl and decanoyl, the steps comprising dissolving the 4-acylamino 4'-aminodiphenylsulfone in a solvent, adding hydrochloric acid to the resulting solution to form the corresponding hydrochloride, precipitating said hydrochloride by adding water to said solution, recovering the precipitate, dissolving the precipitate in a solvent, adding water to form 4-acylamino, 4'-aminodiphenylsulfone, and crystallizing same from the solution.

RICHARD S. GUBNER.

REFERENCES CITED

The following references are of record in the file of this patent:

UNITED STATES PATENTS

| Number | Name | Date |
|---|---|---|
| 2,267,748 | Pohls et al. | Dec. 30, 1941 |
| 2,291,285 | Phols et al. | July 28, 1942 |
| 2,325,344 | Shonle et al. | July 27, 1943 |

FOREIGN PATENTS

| Number | Country | Date |
|---|---|---|
| 517,457 | Great Britain | May 3, 1939 |

OTHER REFERENCES

Shonle et al., "Jour. Am. Chem. Soc., vol. 65 (1943), pp. 2375-2377.